US008615877B2

(12) United States Patent
Charleux et al.

(10) Patent No.: US 8,615,877 B2
(45) Date of Patent: Dec. 31, 2013

(54) METHOD OF PRODUCING A NOZZLE OR A DIVERGENT NOZZLE ELEMENT MADE OF A COMPOSITE

(75) Inventors: François Charleux, Bordeaux (FR); Jean-Marie Parenteau, Bordeaux (FR); Bernard Delperier, Merignac (FR)

(73) Assignee: Snecma Propulsion Solide, Le Haillan Cedex (FR)

( * ) Notice: Subject to any disclaimer, the term of this patent is extended or adjusted under 35 U.S.C. 154(b) by 300 days.

(21) Appl. No.: 13/054,348

(22) PCT Filed: Jul. 13, 2009

(86) PCT No.: PCT/FR2009/051397
§ 371 (c)(1),
(2), (4) Date: Jan. 14, 2011

(87) PCT Pub. No.: WO2010/007308
PCT Pub. Date: Jan. 21, 2010

(65) Prior Publication Data
US 2011/0121109 A1 May 26, 2011

(30) Foreign Application Priority Data
Jul. 17, 2008 (FR) ...................................... 08 54859

(51) Int. Cl.
*B21D 53/00* (2006.01)
(52) U.S. Cl.
USPC .................................. 29/890.01; 29/890.142
(58) Field of Classification Search
USPC .............. 29/890.01, 890.142; 264/29.1, 29.7; 60/200.1; 65/463
See application file for complete search history.

(56) References Cited

U.S. PATENT DOCUMENTS 4,182,495 A   1/1980   Borgmeier et al.
(Continued)

FOREIGN PATENT DOCUMENTS

EP   0 555 130   8/1993
EP   0 633 233   1/1995
(Continued)

OTHER PUBLICATIONS

International Search Report as issued for PCT/FR2009/051397, dated Dec. 30, 2009.

*Primary Examiner* — David Bryant
*Assistant Examiner* — Moshe Wilensky
(74) *Attorney, Agent, or Firm* — Pillsbury Winthrop Shaw Pittman, LLP

(57) ABSTRACT

A fiber preform is obtained by conforming panels of fiber texture on a former having a surface that reproduces the shape desired for a surface of the nozzle or the nozzle divergent section that is to be made. The panels are bonded together via their mutually contacting edges. A consolidated fiber reinforcement is formed by shaping the fiber preform impregnated with a consolidation composition including a resin. The shaping of the fiber preform is performed between the former and a jacket applied against the impregnated fiber preform so as the consolidated fiber reinforcement has a fiber volume percentage of at least 35%, and a thickness of less than 5 mm over at least a major fraction of its axial dimension. The densification of the fiber reinforcement is continued by chemical vapor infiltration after pyrolyzing the resin so that once densified, a part is obtained that has practically the shape and the wall thickness of the nozzle or the nozzle divergent section that is to be made.

12 Claims, 6 Drawing Sheets

(56) References Cited

U.S. PATENT DOCUMENTS

| | | |
|---|---|---|
| 5,048,289 A | 9/1991 | Brown |
| 5,486,379 A * | 1/1996 | Bouillon et al. ............. 427/212 |
| 6,817,184 B2 | 11/2004 | Groeber et al. |
| 2003/0136128 A1* | 7/2003 | Groeber et al. ................ 60/771 |
| 2005/0084377 A1* | 4/2005 | Dambrine et al. ........ 416/223 R |
| 2010/0323830 A1* | 12/2010 | Blotteaux et al. ............ 473/563 |

FOREIGN PATENT DOCUMENTS

| | | |
|---|---|---|
| EP | 1 932 653 | 6/2008 |
| FR | 2 832 762 | 5/2003 |
| FR | 2 882 356 | 8/2006 |
| FR | 2 907 778 | 5/2008 |
| WO | WO 96/31447 | 10/1996 |
| WO | WO 01/38625 | 5/2001 |
| WO | WO 2006/136755 | 12/2006 |

* cited by examiner

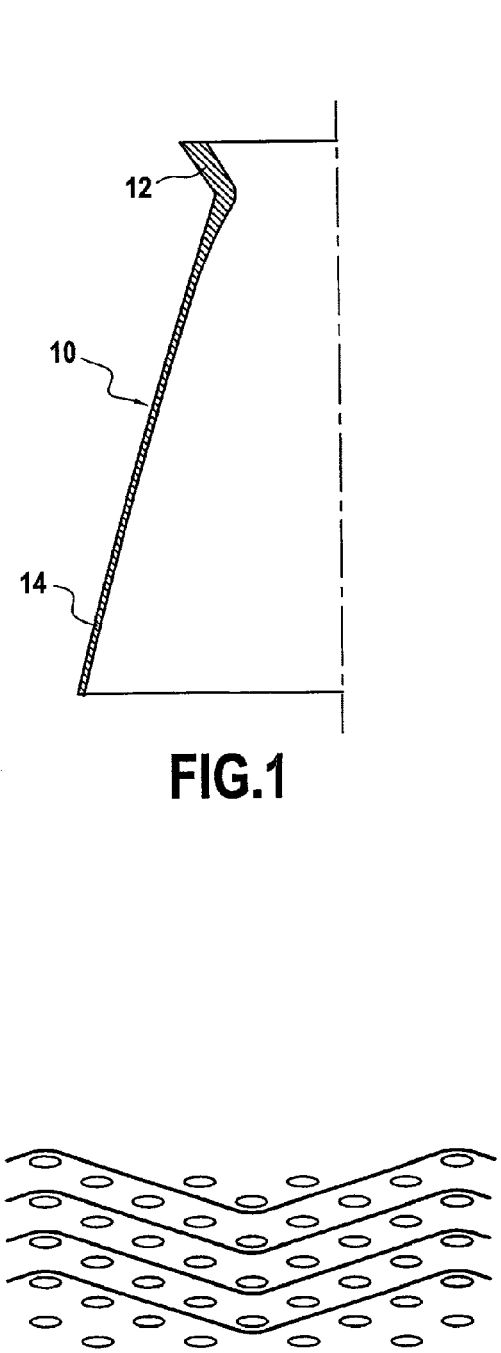
FIG.1
FIG.3
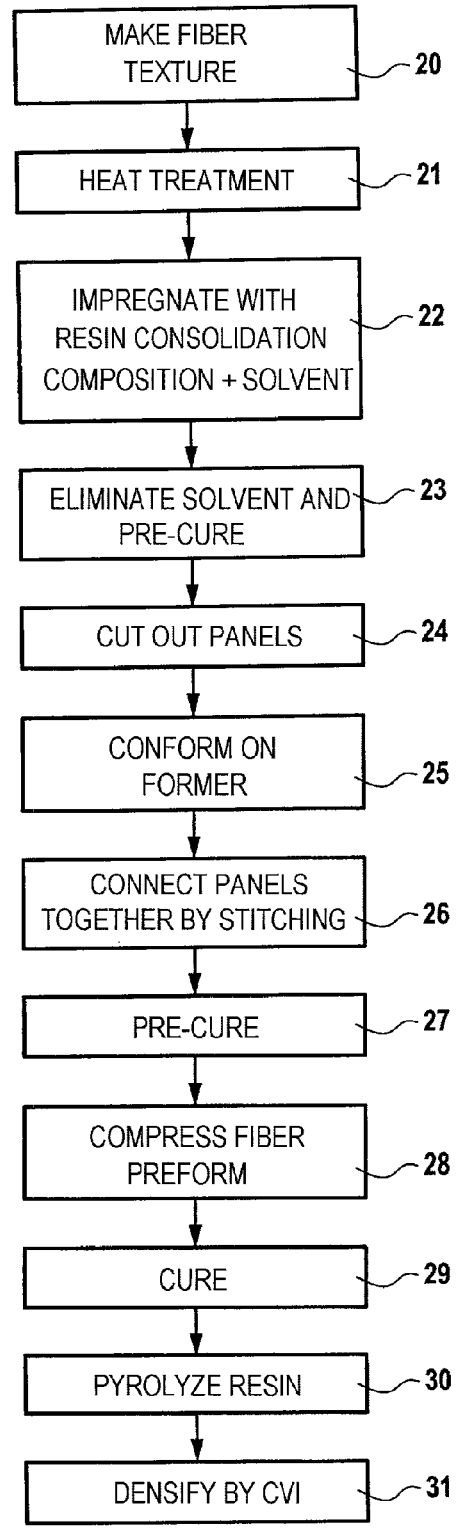
FIG.2

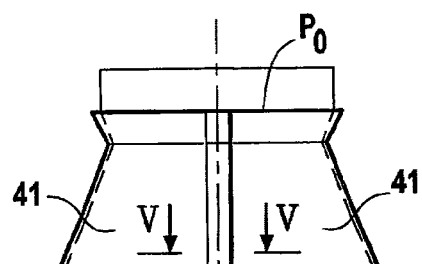
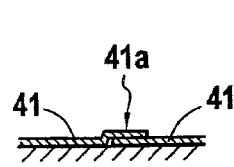
FIG.4   FIG.5
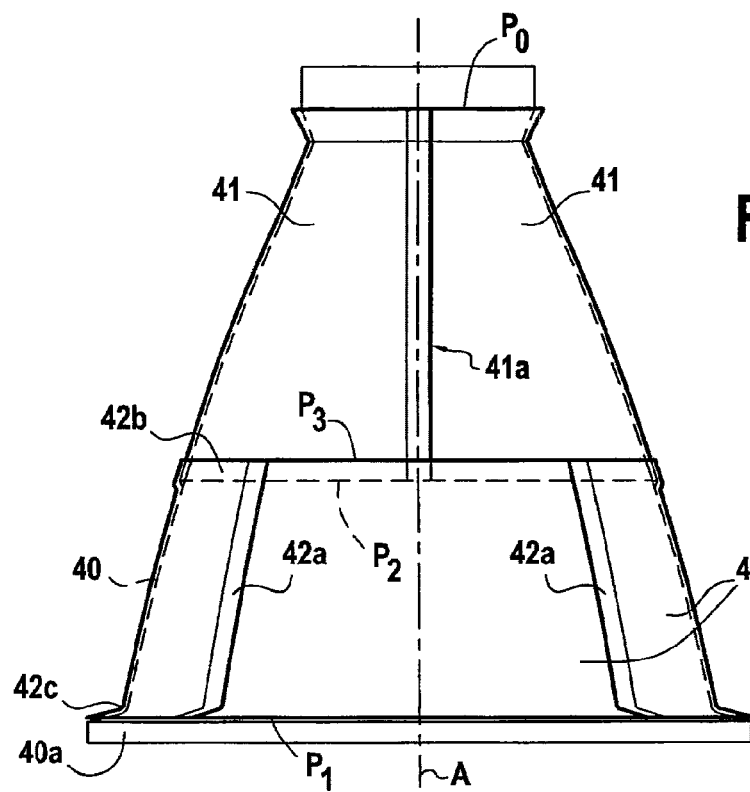
FIG.6

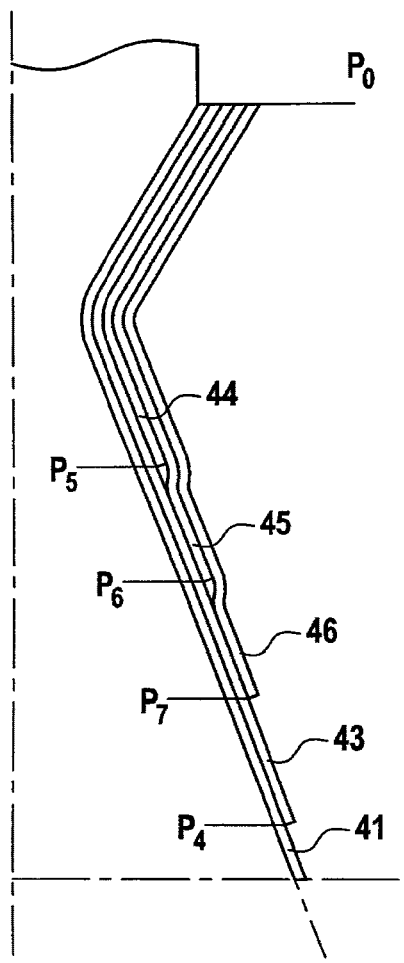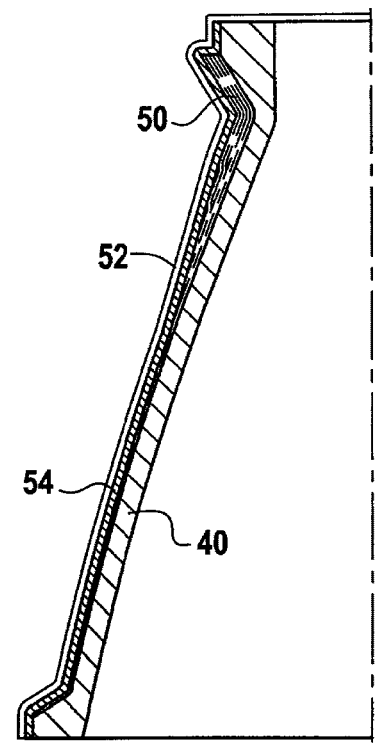
FIG.9
FIG.10

METHOD OF PRODUCING A NOZZLE OR A DIVERGENT NOZZLE ELEMENT MADE OF A COMPOSITE

CROSS-REFERENCE TO RELATED APPLICATIONS

This application is the U.S. National Stage of PCT/FR2009/051397, filed Jul. 13, 2009, which in turn claims priority to French application Ser. No. 08/54859, filed Jul. 17, 2008. The content of both applications are incorporated herein by reference in their entirety.

BACKGROUND OF THE INVENTION

The invention relates to making a nozzle or a nozzle divergent section as a single piece of composite material comprising fiber reinforcement densified by a matrix.

The field of application of the invention is more particularly that of nozzles for rocket engines or aeroengines.

For parts that are to be used in the fields of space or aviation, it is well known to use thermostructural composite materials, i.e. composite materials that have mechanical properties making them suitable for constituting structural elements and also having the ability to conserve these properties at high temperatures. Such thermostructural materials are in particular carbon/carbon (C/C) composite materials (carbon fiber reinforcement and carbon matrix); and ceramic matrix composite materials (CMC), e.g. C/SiC (carbon fiber reinforcement and silicon carbide matrix), C/C—SiC (carbon fiber reinforcement and mixed carbon and silicon carbide matrix), or indeed SiC/SiC.

The fiber reinforcement for thermostructural composite materials may be obtained by winding filaments or by superposing fiber plies on a former so as to obtain a fiber preform having a shape that is close to the shape of the part that is to be made. Fiber plies can be bonded to one another, in particular by needling, using barbed needles that move fibers transversely relative to the plies, thereby providing bonding between the plies so as to increase resistance to delamination, i.e. resistance to the plies separating from one another.

Densifying the fiber reinforcement by a carbon or a ceramic matrix may be performed using a liquid technique or by chemical vapor infiltration (CVI). Densification using a liquid technique comprises, in well-known manner, impregnating the fiber reinforcement with a liquid composition containing a carbon- or ceramic-precursor resin, and then polymerizing and pyrolyzing the resin so as to obtain a carbon or ceramic residue, with it being possible to perform a plurality of consecutive cycles of impregnation, polymerization, and pyrolysis. CVI densification is performed in well-known manner by placing the fiber reinforcement in an enclosure and by admitting a reaction gas into the enclosure such that under determined conditions of pressure and temperature, in particular, the gas diffuses into the fiber reinforcement and serves to deposit matrix material by means of one or more of the components of the gas decomposing or by means of one or more of its components reacting. For parts of particular shape, in particular of complex shape, a first step of consolidation using the liquid technique may be performed on appropriate tooling in order to freeze the fiber reinforcement into the desired shape, with densification being continued without using tooling, e.g. by CVI. Associating consolidation using a liquid technique and densification by CVI is described in particular in document EP-A-0 633 233.

Proposals have already been made to make a nozzle divergent section out of thermostructural composite material.

Thus, document U.S. Pat. No. 6,817,184 discloses a method of fabricating a thin-walled C/SiC material divergent section by winding filaments of carbon fiber yarns and shaping so as to obtain integrated flange portions with continuity of the fiber reinforcement. Carbon fabric inserts may be inserted to increase thickness locally. In that document, a prior technique is mentioned that consists in placing layers of fabric that are superposed on a former, in impregnating the layers of fabric with a carbon precursor resin, and after pyrolyzing the resin, in performing infiltration with molten silicon so as to obtain a C/SiC composite.

Another known process that is used by the Applicant comprises forming fiber reinforcement by superposing and needling fiber plies on a former and densifying the fiber reinforcement by a matrix obtained by CVI. As mentioned above, compared with fiber reinforcement made up of superposed layers that are not bonded to one another, needling provides resistance to delamination, and thus better mechanical strength. In order to obtain needled reinforcement having substantially uniform characteristics, it is nevertheless necessary to make a needled preform that is relatively thick, with only a central portion thereof being usefully usable. For example, in order to obtain useful reinforcement thickness of 3 millimeters (mm), it is necessary to make a needled fiber preform having a total thickness of 20 mm. Making the fiber reinforcement is thus lengthy and expensive, requiring various manipulations, and leading to large losses of material. In addition, the fiber volume percentage in the needled fiber reinforcement is relatively low, thereby limiting the mechanical properties of the resulting nozzle or nozzle divergent section.

OBJECT AND SUMMARY OF THE INVENTION

An object of the invention is to propose a method enabling a thin-walled nozzle or nozzle divergent section to be made out of composite material having very good mechanical strength, while avoiding the above-mentioned drawbacks.

This object is achieved by a method comprising:
  obtaining panels of a fiber texture obtained by three-dimensional weaving;
  forming a fiber preform by conforming the panels on a former having a surface that reproduces the shape desired for an inner or outer surface of the nozzle or the nozzle divergent section that is to be made, and by connecting together the panels via mutually contacting edges;
  forming consolidated fiber reinforcement by shaping the fiber preform impregnated with a consolidation composition comprising a resin, shaping being performed between the former and a jacket applied against the impregnated fiber preform so as to obtain consolidated fiber reinforcement having a fiber volume percentage of at least 35%, and having over at least a major fraction of its axial dimension a thickness of no more than 5 mm formed by a single layer of fiber texture panels; and
  continuing densification of the consolidated fiber reinforcement by chemical vapor infiltration after pyrolyzing the resin so that after densification a part is obtained that has practically the shape and the wall thickness of the nozzle or nozzle divergent section that is to be made.

The method of the invention is remarkable in that it makes the following possible simultaneously:
  directly obtaining a thin-walled nozzle or nozzle divergent section that is very light, typically a wall that presents thickness of no more than about 5 mm over the major fraction of its axial dimension, and preferably thickness of no more than 3 mm or even less than 2 mm, e.g. lying in the range 2 mm to 1 mm, or even less, while being capable of having dimensions that are relatively large, such as an axial dimension that may exceed 2000 mm and an inside outlet diameter that may exceed 3000 mm;

directly obtaining a "near net shape" nozzle or nozzle divergent section, i.e. one having a shape that is very close to its final complete shape, with an inner or outer main surface and advantageously also at least a large fraction of its other main surface presenting the desired shapes without requiring these surfaces to be machined at the finished part stage or even at the fiber reinforcement stage; it is thus possible to obtain the desired aerodynamic profile directly, it being possible to restrict any final machining to the longitudinal ends, in particular to restrict it to functional machining to provide interface and connection portions; and obtaining a nozzle or nozzle divergent section having very good mechanical properties by using panels made of a fiber texture obtained by three-dimensional (3D) weaving, i.e. having a plurality of layers of yarns that are bonded together by weaving, thereby reducing any risk of delamination compared with two-dimensional (2D) plies that are superposed in the form of 2D fabrics or sheets, and by having a relatively high fiber content.

In addition, densification is performed on fiber reinforcement that is consolidated, and thus partially densified, and of limited thickness corresponding to the thickness of the wall of the nozzle or nozzle divergent section that is to be made. Densifying such thin fiber reinforcement can then be achieved with a densification gradient across its thickness that is small or very small.

Preferably, the fiber preform is shaped so as to obtain fiber reinforcement presenting stiffener portions integrated at least in axial end portions thereof. The stiffener portions guarantee compliance with the desired shape in spite of the very thin wall thickness, at least until densification of the fiber reinforcement.

At least one of the stiffener portions may be obtained by conferring an angle-forming profile or by locally increasing the thickness of the wall of the fiber reinforcement at an axial end portion of the fiber reinforcement.

The panels may be conformed on the former with their adjacent edges overlapping.

The fiber preform may be formed with at least one extra thickness extending circumferentially all around an axis of the preform, the extra thickness being obtained, for example, by mutual overlapping of adjacent edges of fiber texture panels.

The panels may be bonded to one another to form the fiber preform by stitching.

Advantageously, while shaping to form the fiber reinforcement, the impregnated fiber preform is compressed to have a high fiber volume percentage. During compression of the impregnated fiber preform, a diaphragm is advantageously applied to the fiber preform, e.g. a diaphragm made of an elastomer that is elastically deformable without forming creases. This makes it possible to obtain fiber reinforcement in which the surface remote from its surface applied to the former is free from defects.

Impregnation with the consolidation composition may be performed on the fiber texture prior to conforming the fiber texture panels on the former.

Preferably, prior to shaping the fiber preform in order to form the fiber reinforcement, the resin of the consolidation composition is pre-cured. The stiffness of the fiber texture may thus be increased in order to avoid excessive subsequent compression. The pre-curing of the resin may be performed at least in part prior to conforming the impregnated fiber texture panels.

The invention also provides thin-walled and low-weight nozzles and nozzle divergent sections made in this way out of composite material, in particular nozzles or nozzle divergent sections having a thickness of no more than 3 mm over a major fraction of their axial dimension, or even of thickness lying in the range 1 mm to 2 mm, while being capable of having dimensions that are relatively large, such as an axial dimension of at least 800 mm and an inside diameter at the downstream end of at least 1000 mm.

BRIEF DESCRIPTION OF THE DRAWINGS

Embodiments of the invention are described below by way of non-limiting indication and with reference to the accompanying drawings, in which:

FIG. 1 is a half-view in axial section of an example of a divergent section of a nozzle that can be made by a method of the invention;

FIG. 2 shows the steps of a method in an implementation of the invention;

FIG. 3 shows an example of an interlock weave for 3D weaving of a fiber ply;

FIGS. 4 to 8 show successive steps in making a fiber preform for fabricating the FIG. 1 nozzle divergent section in an implementation of the invention, FIG. 5 being a fragmentary section view on plane V-V of a detail of FIG. 4;

FIG. 9 is a half-view in axial section on an enlarged scale showing the conforming of fiber texture panels on a former for the purpose of making a fiber preform portion of varying thickness;

FIG. 10 is a half-view in axial section showing fiber reinforcement for a nozzle divergent section obtained by compressing a fiber preform between a former and a jacket, with an interposed elastomer diaphragm;

DETAILED DESCRIPTION OF EMBODIMENTS

Figure 7:
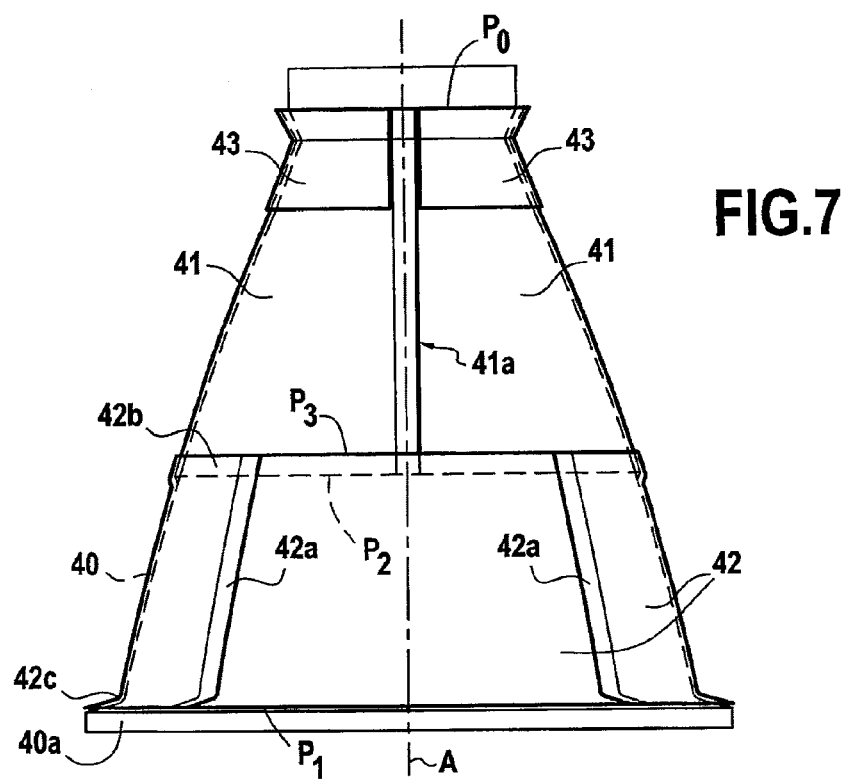

FIG. 1 is an axial half-section of a divergent section 10 of a rocket engine nozzle that can be made by a method of the invention.

The nozzle divergent section 10 may be made of carbon/carbon (C/C) composite material comprising fiber reinforcement made of carbon fibers that is densified by a matrix likewise made of carbon. The nozzle divergent section may equally well be made of a carbon/carbon-ceramic composite material comprising fiber reinforcement made of carbon fibers that is densified by a mixed carbon and ceramic matrix, the ceramic constituting an outer phase of the matrix and providing protection against oxidation. The ceramic phase of the matrix may be made of silicon carbide or it may be formed by a Si—B—C ternary system, for example. The nozzle divergent section may also be made of a carbon/ceramic composite material comprising fiber reinforcement made of carbon fibers that is densified by a matrix that is made of ceramic or essentially of ceramic.

In this example, the nozzle divergent section 10 is axially symmetrical with an upstream portion 12 forming a fastener flange that is extended downstream by a divergent section proper 14, with the terms "upstream" and "downstream"

being used herein with reference to the flow direction of gas through the divergent section. The flange 12 enables the divergent section 10 to be fastened to a rocket engine body at the outlet from a combustion chamber. In the flange-forming portion 12, going from the upstream end, the wall thickness of the divergent section 10 decreases progressively and it is subsequently substantially constant and at a minimum in the portion 14. In addition, in the flange-forming portion 12 and going from the upstream end, the diameter decreases, and then subsequently increases in the portion 14, the diameter of the divergent section 10 thus passing through a minimum at the connection between its portions 12 and 14.

A first step 20 of the method (FIG. 2) consists in making a fiber texture forming a base texture for the fiber reinforcement of the composite material. The texture is preferably obtained by three-dimensional (3D) weaving of carbon fibers. It is possible to implement multi-layer weaving with an interlock weave, a plane of which is shown in FIG. 3. Each layer of warp yarns connects together a plurality of layers of weft yarns (shown in section) with all of the yarns of a given warp column moving in the same manner in the plane of the weave. Nevertheless, other types of multi-layer weaving may be used, in particular multi-plain or multi-satin weaves. Various multi-layer type 3D weaving techniques are described in document WO-A-2006/136755.

The fiber texture is advantageously subjected to heat treatment (step 21), at a temperature lying in the range 1400° C. to 2200° C. and under a vacuum or an inert atmosphere, e.g. under nitrogen or argon. This heat treatment serves in particular to obtain a purifying effect (eliminating the N, O, Na, and Ca elements contained in the fibers) and it enables better thermomechanical properties to be obtained for the composite material.

The fiber texture is impregnated with a consolidation composition (step 22). Impregnation may be performed merely by immersion in a bath of a resin in a solvent. A resin is used that, after drying and polymerization, leaves a solid residue that is capable of consolidating the fiber reinforcement before pyrolysis of the resin and final densification by CVI, as described below. By way of example, a carbon precursor resin is used that is selected from phenolic or epoxy resins. Impregnation is preferably performed in such a manner as to provide a quantity of resin such that after the subsequent steps of compression to shape the preform, curing of the resin, and pyrolysis of the cured resin, the residual volume percentage after pyrolysis of the resin in the resulting consolidated fiber reinforcement lies in the range 5% to 15% (i.e. the percentage of the apparent volume of the fiber reinforcement that is occupied by the pyrolysis residue of the resin).

The impregnated fiber texture is drained and placed in a stove to eliminate the resin solvent and possibly also to pre-cure the resin (step 23). Pre-curing serves to increase the stiffness of the fiber texture, but it is limited in order to leave sufficient flexibility for subsequent conforming.

Panels are subsequently cut out from the impregnated fiber texture (step 24) so as to form a fiber preform by conforming and assembling panels.

It should be observed that impregnation may be performed after the panels have been cut out, in which case the above-mentioned heat treatment may be performed before or after cutting out the panels, and prior to impregnation.

The impregnated fiber texture panels are conformed on a male former 40 (FIGS. 5 to 8) of outside surface that reproduces the profile desired for the inside surface of the nozzle divergent section that is to be made, thereby producing a fiber preform (step 25).

A first series of panels 41 is placed on the former 40 around the axis A. Each panel 41 extends between two radial planes $P_0$ and $P_2$ and between two meridian planes. The plane $P_0$ corresponds to the plane containing the upstream ends of the fiber preform and of the nozzle divergent section that is to be made. The plane $P_2$ lies approximately in the middle portion of the fiber preform that is to be made. The panels 41 are juxtaposed with their adjacent edges overlapping so as to form extra thicknesses 41a, as can be seen in FIG. 5. In the example shown, there are four panels 41.

A second series of panels 42 is placed on the former 40 around its axis A. Each of the panels 42 extends between two radial planes $P_3$ and $P_1$ and two meridian planes, the plane $P_1$ corresponding to the plane containing the downstream ends of the preform and of the nozzle divergent section to be made, and the plane $P_3$ being situated a little upstream from the plane $P_2$. The panels 42 are juxtaposed with their adjacent edges overlapping so as to form extra thicknesses 42a, in the same manner as the panels 41. In addition, in the axial direction, the panels 41 and 42 are juxtaposed with their adjacent edges overlapping so as to form extra thicknesses 42b between the planes $P_2$ and $P_3$, the edges of the panels 42 overlying the edges of the panels 41. In the example shown, the panels 42 are likewise four in number, but they are angularly offset relative to the panels 41 so that the overlap zones between adjacent edges of the panels 41 do not extend the overlap zones between the adjacent edges of the panels 42.

As its end corresponding to the downstream end of the preform and of the nozzle divergent section to be made, the former 40 presents a portion of larger diameter forming a rim 40a. The ends situated at this level of the panels 42 are curved outwards by pressing against the portion 40a of the former 40, thereby forming an annular rim or flange 42c.

The thickness of the 3D woven fiber texture is selected so that the portion of the nozzle divergent section that presents minimum thickness after the fiber preform has been compressed, as described below, is made using a single layer of fiber reinforcement. This minimum thickness portion of the nozzle divergent section extends over the major fraction of its axial dimension.

In the upstream portion corresponding to the thickest portion of the nozzle divergent section to be made, a plurality of fiber texture layers are superposed.

Figure 8:
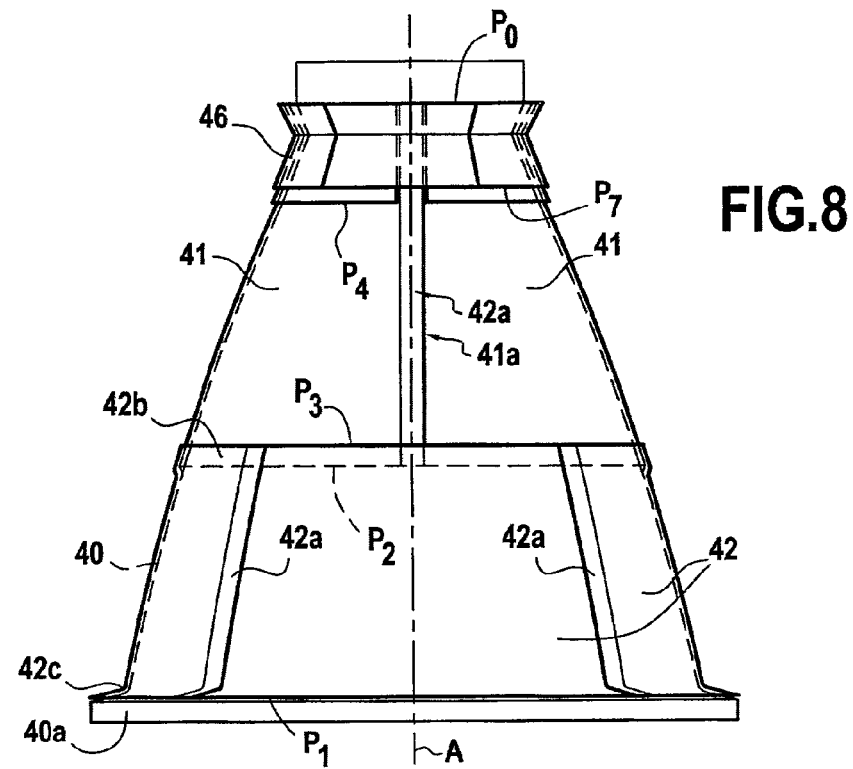

Thus, as shown in FIGS. 7 to 9, a series of panels 43 is placed over the upstream portion of the panels 42, the panels 43 extending between the plane $P_0$ and a radial plane $P_4$ corresponding to the location where the increase in the thickness of the nozzle divergent section to be made begins on moving upstream. There are four of these panels, each occupying a span between two extra thicknesses 42a.

An additional series of four panels 44 (FIG. 9) is placed on the panel 43, the panels 44 extending between the plane $P_0$ and a radial plane $P_5$ situated upstream from the plane $P_4$. The panels 44 are connected together by being juxtaposed edge to edge along meridian planes that are angularly offset relative to the extra thicknesses 42a.

Another additional series of four panels 45 (FIG. 9) is placed on the panels 44, the panels 45 extending between the plane $P_0$ and a radial plane $P_6$ situated between the planes $P_4$ and $P_5$. The panels 45 are joined together by being juxtaposed edge to edge along meridian planes that are angularly offset relative to the meridian planes of the connections between the panels 44.

Finally, an additional series of four panels 46 (FIGS. 8 and 9) is placed on the panels 43, 44, 45, with the panels 46 extending between the plane $P_0$ and a middle plane $P_7$ situated between the planes $P_4$ and $P_6$, such that the panels 46 cover the downstream edges of the panels 44 and 45. The panels 46 are juxtaposed edge to edge along meridian planes that are angularly offset relative to the connection meridian planes of the panels 43, 44, and 45.

Naturally, the number and the arrangement of the series of additional panels in the upstream portion of the fiber preform need to be selected as a function of the profile of the increase in thickness that is to be made.

In order to form a cohesive fiber preform, the fiber texture panels are connected together by implanting carbon threads, or preferably by stitching with carbon threads (step 26). The panels 41 are stitched together along their mutually overlapping edges, as are the panels 42. The panels 41 and 42 are stitched together along their mutually overlapping edges forming the extra thickness 42b. The panels 43, 44, 45, and 46 are assembled to the underlying panels by stitching.

In each series of panels, the number of panels may naturally be other than four, and may differ from one series to another, in particular depending on the capacity of the panels to fit closely to the shape of the former without forming significant surface irregularities. Similarly, the number of series of panels defining the minimum thickness of the fiber preform may be unitary or greater than two. The minimum thickness is selected so as to ensure, after forming the fiber reinforcement and densification, that a desired wall thickness is obtained of no more than 5 mm, advantageously of no more than 3 mm, or even less than 2 mm, e.g. lying in the range 2 mm to 1 mm, or even less.

Naturally, other ways of arranging fiber texture panels may be adopted, the panels preferably being selected to have the greatest size that enables them to be conformed without substantial deformation of their surface.

Furthermore, it is possible to impregnate the fiber texture by applying a consolidation composition onto the fiber preform, after it has been assembled.

Once the fiber preform has been assembled, the resin of the consolidation composition may be pre-cured or its pre-curing may be continued (step 27) so as to increase the stiffness of the fiber preform, while leaving it with sufficient flexibility to be capable subsequently of being compressed. It is thus possible to limit the flattening of the fiber preform during subsequent compression. Any pre-curing of the resin may thus be performed in two stages, one performed with the impregnated fiber texture panels prior to being conformed on the former 40, and the other being performed after the fiber preform has been assembled, or else it may be performed in one only of these two stages.

The fiber preform is advantageously compressed (step 28) so as to obtain fiber reinforcement with a desired fiber volume percentage, i.e. at least 35%, and preferably lying in the range 35% to 50%. To this end, the former 40 and the fiber preform 50 are placed inside a flexible jacket 52 (FIG. 9) and the inside of the jacket is connected to a suction device in order to compress the fiber preform. A diaphragm 54 of elastomer material that is capable of deforming without forming creases may be interposed between the jacket 52 and the preform 50 so as to prevent creases of the jacket 52 marking the outside surface of the fiber reinforcement. It should be observed that insofar as the level of suction inside the jacket can be controlled, there may be no need to pre-cure the resin for the purpose of limiting compression of the fiber preform.

After compression, a step 29 of curing the resin is performed so that a fiber preform is obtained that is consolidated, i.e. that can be handled while retaining its shape.

The consolidated fiber reinforcement is extracted from the tooling that was used for conforming and consolidating it, with the former 40 being made up of a plurality of portions so that it can be disassembled.

At its downstream end, the consolidated fiber reinforcement presents an annular rim corresponding to the rim 42c, thus contributing to stiffening the consolidated fiber reinforcement at this point and enabling the desired shape to be properly conserved at least until the end of the process of fabricating the nozzle divergent section. At its upstream end, the consolidated fiber reinforcement presents firstly extra thickness and secondly a profile forming an angle that corresponds to the connection angle between the flange 12 and the portion 14 of the divergent section that is to be made, both contributing to stiffening and maintaining the shape of the upstream end. It should be observed that an increase in thickness may also be provided at the downstream end in order to provide a stiffening function, at a replacement for or in addition to forming an outside flange.

A step 30 of pyrolyzing the cured resin is performed, e.g. at a temperature of 700° C. to 1200° C. and then the fiber reinforcement is densified by CVI in an oven (step 31). It should be observed that the resin may be pyrolyzed while raising the temperature inside the CVI oven immediately prior to performing densification.

CVI densification is performed so as to obtain a carbon matrix, or a mixed carbon and ceramic matrix, e.g. a carbon and silica carbide (SiC) matrix or a carbon and ternary silicon-boron-carbon system (Si—B—C) matrix, or indeed a ceramic matrix, e.g. a SiC or a Si—B—C matrix.

CVI processes for densifying fiber reinforcement with a pyrolytic carbon (PyC) matrix are well known. The fiber reinforcement is placed in an oven. A reaction gas that is a precursor for PyC is introduced into the oven, typically a gas containing one or more hydrocarbon compounds. Under predetermined conditions of pressure and temperature in particular, the reaction gas diffuses within the internal pores of the fiber reinforcement in order to deposit PyC therein by one or more of the components of the gas decomposing.

CVI processes for forming a SiC matrix or matrix phase are also well known, the reaction gas typically comprising a mixture of methyltrichlorosilane (MTS) and hydrogen gas. In order to form a matrix phase constituted by a Si—B—C ternary system, it is possible to use a reaction gas containing a mixture of MTS, boron trichloride ($BCl_3$), and hydrogen gas.

Since the thickness of the fiber reinforcement is limited, the risk of any significant densification gradient between the core of the fiber reinforcement and its surface portions is avoided.

A stiffened part is thus obtained directly having the shape desired for the nozzle divergent section, at least concerning its inside surface and advantageously also concerning practically all of its outside surface, with any finishing machining possibly being limited to the end portions, in particular at the abutment. The stiffener portion forming the outer rim at the downstream end of the consolidated fiber reinforcement may be eliminated after densification if it is not useful in the divergent section.

Furthermore, the presence of the extra thickness 42b gives rise to a reinforced portion that may constitute a stiffener or a support for a stiffener in the middle of the divergent section.

Figure 11:
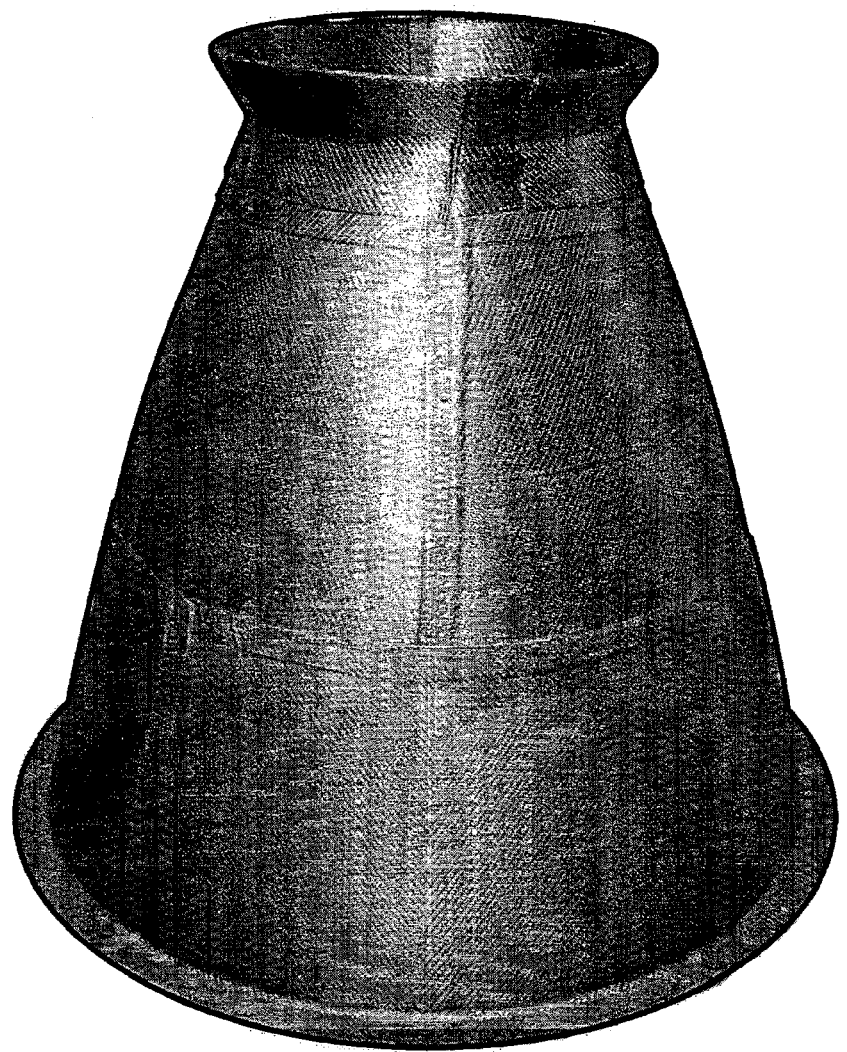
FIG. 11 is a photograph of a nozzle divergent section as obtained by a method in accordance with the invention, prior to final machining.

FIG. 11 is a photograph showing a nozzle divergent section after densification and prior to final machining, as obtained by a method similar to that described with reference to FIGS. 2 to 10, the base fiber texture used being a three-dimensional fabric having an interlock weave that is 1.5 mm thick. The divergent section proper had an inside diameter running from about 400 mm at its connection with the flange to about 1020 mm at its downstream end. The total length of the divergent section was about 970 mm including about 850 mm for the divergent section proper (not including the flange). Remarkably for such a size, after densification, the divergent section presented a high fiber content of about 42% and very low weight, i.e. about 6.48 kilograms (kg), the weight of the consolidated fiber reinforcement prior to final densification and after curing the resin being about 5.52 kg. In the portion forming the divergent section proper, the wall thickness was about 1.5 mm outside zones corresponding to overlaps between fiber texture panels.

Figure 12:
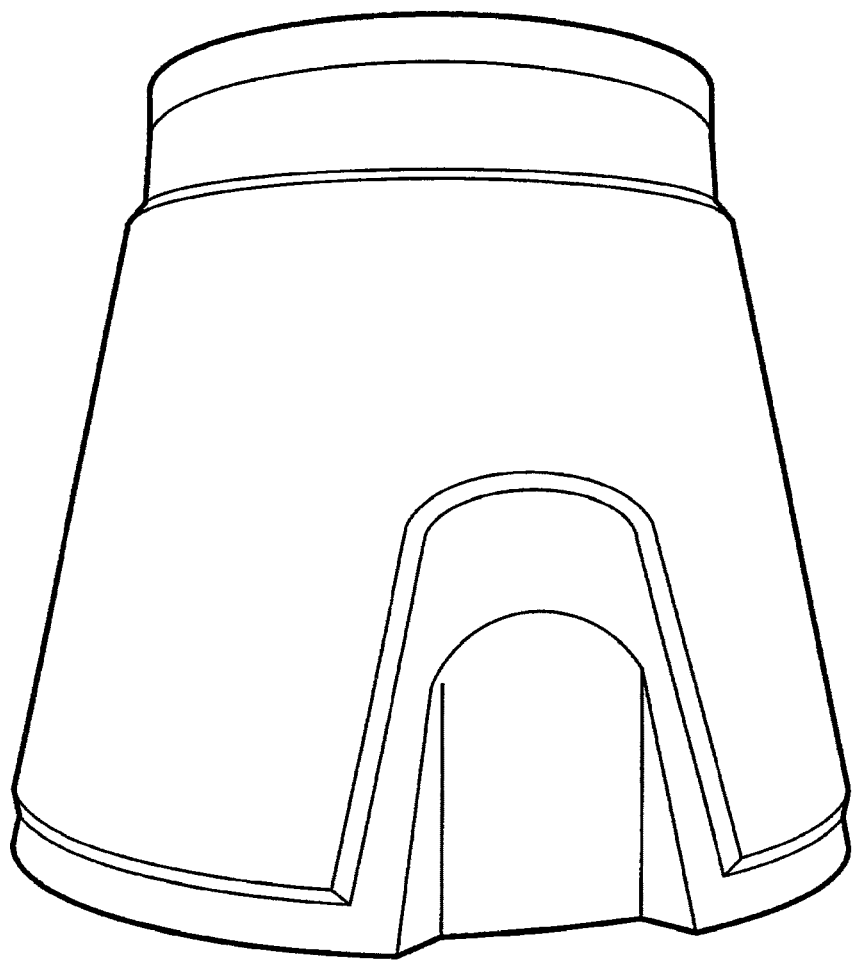
FIG. 12 is a perspective view of an example nozzle that can be made by a method of the invention.

The invention is not limited to making divergent sections of rocket engine nozzles. It may be applied to making nozzles for aeroengines for airplanes or helicopters. FIG. 12 shows one such nozzle for a gas turbine airplane engine. At its axial ends, the nozzle presents portions of profile that forms an angle, which portions in the fiber reinforcement stage constitute stiffener portions.

The invention is remarkable in particular in that it makes it possible to obtain thin-walled lightweight nozzles or nozzle divergent sections capable of having relatively large dimensions, in particular an axial dimension of at least 800 mm and an inside diameter at the downstream end of at least 1000 mm.

For aeroengine nozzles, the composite material may be a ceramic matrix composite material (CMC) with fiber reinforcement made of ceramic fibers, e.g. of silicon carbide, and a matrix that is likewise made of ceramic, e.g. likewise silicon carbide, with the consolidation resin then preferably being a ceramic precursor resin.

In certain applications, in particular for aeroengine nozzles, the shaping of the fiber preform and the conforming of the fiber reinforcement may be performed on a female former presenting an inside surface that reproduces the shape desired for an outside surface of the nozzle.

It should also be observed that the invention is applicable to making nozzles or nozzle divergent sections that are not necessarily completely axially symmetrical, as for the nozzle shown in FIG. 12.

The invention claimed is:

1. A method of making a thin-walled nozzle or nozzle divergent section out of composite material comprising fiber reinforcement densified by a matrix, the method comprising:
    obtaining panels of a fiber texture obtained by three-dimensional weaving;
    forming a fiber preform by conforming the panels on a former having a surface that reproduces the shape desired for an inner or outer surface of the nozzle or the nozzle divergent section that is to be made, the fiber preform being formed over at least a major fraction of its axial dimension by a single layer of said panels connected together via mutually contacting edges;
    forming consolidated fiber reinforcement by shaping the fiber preform impregnated with a consolidation composition comprising a resin, shaping being performed between the former and a jacket applied against the impregnated fiber preform so as to obtain consolidated fiber reinforcement having a fiber volume percentage of at least 35%, and having over said major fraction of its axial dimension a thickness of no more than 5 mm; and
    continuing densification of the consolidated fiber reinforcement by chemical vapor infiltration after pyrolyzing the resin so that after densification a part is obtained that has practically the shape and the wall thickness of the nozzle or nozzle divergent section that is to be made.

2. A method as claimed in claim 1, wherein the fiber preform is shaped so as to obtain fiber reinforcement presenting stiffener portions integrated at least in axial end portions thereof.

3. A method as claimed in claim 2, wherein at least one stiffener portion is obtained by imparting an angle-forming profile to an axial end portion of the consolidated reinforcement.

4. A method as claimed in claim 2, wherein at least one stiffener portion is obtained by locally increasing the wall thickness of the consolidated reinforcement.

5. A method as claimed in claim 1, wherein the panels are conformed on the former with their adjacent edges overlapping.

6. A method as claimed in claim 1, wherein the fiber preform is formed with at least one extra thickness extending circumferentially all around an axis of the preform, the extra thickness being obtained by mutual overlapping of adjacent edges of fiber texture panels.

7. A method as claimed in claim 1, wherein the panels are bonded together by stitching.

8. A method as claimed in claim 1, wherein, while being shaped to form the fiber reinforcement, the impregnated fiber preform is compressed.

9. A method as claimed in claim 8, wherein during compression of the impregnated fiber preform, a diaphragm that is elastically deformable without forming creases is applied on the fiber preform.

10. A method as claimed in claim 1, wherein impregnation with the consolidation composition is performed on the fiber texture prior to conforming the fiber texture panels on the former.

11. A method as claimed in claim 1, wherein, prior to conforming the fiber preform in order to form the fiber reinforcement, the resin of the consolidation composition is pre-cured.

12. A method as claimed in claim 10, wherein, following impregnation of the fiber texture with the consolidation composition, pre-curing of the resin of the consolidation composition is performed at least in part prior to conforming the impregnated fiber texture panels on the former.

* * * * *